US010625567B2

(12) United States Patent
Dudar (10) Patent No.: US 10,625,567 B2
(45) Date of Patent: Apr. 21, 2020

(54) SYSTEM AND METHOD FOR CORRECTING AMBIENT AIR TEMPERATURE MEASUREMENT USING A WIRELESS NETWORK

(71) Applicant: Ford Global Technologies, LLC, Dearborn, MI (US)

(72) Inventor: Aed M Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 479 days.

(21) Appl. No.: 15/628,381

(22) Filed: Jun. 20, 2017

(65) Prior Publication Data

US 2018/0361820 A1 Dec. 20, 2018

(51) Int. Cl.
*B60H 1/00* (2006.01)
*H01Q 1/32* (2006.01)
*G01K 1/20* (2006.01)
*G01K 1/02* (2006.01)

(52) U.S. Cl.
CPC ....... *B60H 1/0075* (2013.01); *B60H 1/00792* (2013.01); *B60H 1/00807* (2013.01); *G01K 1/20* (2013.01); *H01Q 1/3266* (2013.01); *G01K 1/02* (2013.01)

(58) Field of Classification Search
CPC .................................................... B60H 1/0075
See application file for complete search history.

(56) References Cited

U.S. PATENT DOCUMENTS

| 6,091,324 | A | 7/2000 | Arsenault et al. |
| 7,282,881 | B2 | 10/2007 | Kay |
| 7,445,383 | B2 | 11/2008 | Huttenlocher et al. |
| 7,629,562 | B2 | 12/2009 | Kuechler |

(Continued)

FOREIGN PATENT DOCUMENTS

| FR | 2943124 A1 | 9/2010 |
| FR | 3006644 A1 | 12/2014 |
| GB | 2556162 A | 5/2018 |

OTHER PUBLICATIONS

Search Report dated Nov. 16, 2018 for GB Patent Application No. GB 1810039.6 (5 pages).

*Primary Examiner* — Manuel A Rivera Vargas
(74) *Attorney, Agent, or Firm* — Frank Lollo; Eversheds Sutherland (US) LLP (57) ABSTRACT

Embodiments include a vehicle comprising a mirror assembly attached to a vehicle side and including an air temperature sensor for measuring a first temperature value; a wireless transceiver for receiving a second temperature value from a wireless network; and a processor configured to, upon determining that the first temperature value is greater than the second temperature value, cause the mirror assembly to move to a first position relative to the vehicle side. Another embodiment includes a method of correcting air temperature reading in a vehicle, the method comprising obtaining a first temperature measurement from an air temperature sensor located in a mirror assembly attached to a vehicle side; obtaining a second temperature measurement from a wireless network; and upon determining that the first temperature measurement is greater than the second temperature measurement, causing the mirror assembly to move to a first position relative to the vehicle side.

13 Claims, 4 Drawing Sheets

(56) References Cited

U.S. PATENT DOCUMENTS

| | | | |
|---|---|---|---|
| 9,478,079 B2 | 10/2016 | Lenhardt et al. | |
| 2008/0042053 A1* | 2/2008 | Kuechler | B60H 1/00792 250/239 |

\* cited by examiner

SYSTEM AND METHOD FOR CORRECTING AMBIENT AIR TEMPERATURE MEASUREMENT USING A WIRELESS NETWORK

TECHNICAL FIELD

This application generally relates to measuring ambient air temperature in a vehicle and more specifically, to correcting such measurements using a wireless network.

BACKGROUND

Most vehicles include an ambient air temperature (AAT) sensor for measuring an outside air temperature. The temperature readings are often displayed on a dashboard or instrument panel of the vehicle, or on an infotainment display screen, for the vehicle operator's convenience. AAT measurements are also used by various engine controls and for certain on-board diagnostics (OBD).

In some vehicles, the AAT sensor is located on a side rear-view mirror (or side mirror) attached to the exterior of the vehicle. At times, such positioning of the AAT sensor can cause inaccurate or inflated temperature readings due to sun loading, for example, when the vehicle has been parked in direct sunlight for some time or when the sun is shining directly onto the side mirror or AAT sensor. AAT readings tend to become more reliable once the vehicle is traveling fast enough to cause air flow across the side mirror and/or sensor, thus cooling down the sensor to ambient air temperature levels. In addition, since the AAT sensor is typically mounted on the bottom of the side mirror, air flow over the sensor improves when the side mirror is in an unfolded position extending out from the side of the vehicle.

In autonomous vehicles, side mirrors are often folded back against the sides of the vehicle to steer clear of objects positioned close to the vehicle, especially when driving in the city. The side mirrors may also be folded during highway travel in order to improve fuel economy, since the side mirrors can introduce aerodynamic drag. However, when the mirrors are in this folded state, the AAT sensor may not experience adequate air flow for producing accurate temperature measurements, especially if the sun is shining directly on the folded side mirror.

Overinflated or inaccurate AAT readings can affect controls or diagnostics that rely on the temperature readings to make certain decisions. For example, some engine control units use the AAT reading to determine how much the Air/Fuel ("A/F") ratio should be enriched during cold starts. Overestimating the ATT reading during a crank or start event due to sun loading may result in prolonged start times and increased emissions. As another example, the Evaporative Emission Control System (or "Evap System") uses the AAT measurement to adjust pass/fail thresholds and to determine when to execute an Evap leak diagnostic. In some vehicles, the Evap leak diagnostic issues a warning if Evap leak detection occurs while ambient temperature is within a predetermined range (e.g., 40-95 degrees Fahrenheit (F)). If the actual temperature is lower than that range (e.g., 30 degrees F.) but sun loading on the AAT sensor is causing an inaccurately high temperature reading (e.g., 45 degrees F.), the Evap leak diagnostic will unnecessarily execute.

Accordingly, there is still a need in the art for an ambient air temperature sensor system that can reliably provide accurate AAT readings.

SUMMARY

The invention is intended to solve the above-noted and other problems by providing systems and methods designed to (1) identify inaccurate ambient air temperature measurements made by an air temperature sensor located in a power mirror assembly using temperature readings received from a wireless communication network, such as, for example, a Dedicated Short Range Communications (DSRC) network, and (2) take corrective action to rectify the inaccurate temperature reading by at least automatically changing a position of the power mirror assembly to allow more air flow across the sensor or otherwise reduce the effect of sun loading.

For example, one embodiment includes a vehicle comprising a mirror assembly attached to a vehicle side and including an air temperature sensor for measuring a first temperature value. The vehicle further includes a wireless transceiver for receiving a second temperature value from a wireless network, and a processor configured to, upon determining that the first temperature value is greater than the second temperature value, cause the mirror assembly to move to a first position relative to the vehicle side.

Another example embodiment includes a method of correcting air temperature reading in a vehicle. The method includes obtaining a first temperature measurement from an air temperature sensor located in a mirror assembly attached to a vehicle side; obtaining a second temperature measurement from a wireless network; and upon determining that the first temperature measurement is greater than the second temperature measurement, causing the mirror assembly to move to a first position relative to the vehicle side.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Preferred embodiments of the systems and methods disclosed herein utilize dedicated short range communications (DSRC) to obtain ambient air temperature measurements or readings from one or more other vehicles and/or roadside infrastructure. DSRC is a two-way, short-range or medium-range wireless communications technology that is designed for automotive use to exchange a wide range of information in both vehicle-to-vehicle (V2V) applications and vehicle-to-infrastructure (V2I) applications (e.g., government infrastructure). For example, DSRC technology has been proposed for use in a number of roadside applications, including improve traffic safety, provide accident reports, convey approaching emergency vehicle warnings and/or sudden braking ahead warnings, and accept electronic parking and toll payments. Because the DSRC range is relatively short (e.g., 100-1000 meters), DSRC infrastructure (or roadside units) will be widely and densely deployed at intersections and along roadways within a given metropolitan area in order to facilitate communication across the entire area and form a robust DSRC network. Compared to other wireless technologies (e.g., WiFi, satellite, Near Field Communication (NFC), Bluetooth, etc.), DSRC technology can permit secure, reliable communications directly between vehicles, or between vehicles and roadside units (e.g., over a dedicated communications channel), and can be used to conduct point-to-point wireless communications (e.g., wireless messages directed at a specific vehicle or roadside unit), as well as to broadcast wireless messages to all vehicles and roadside units within a limited broadcast area. In the United States, DSRC is allocated for high frequency radio transmission, for example, in a dedicated 75 MHz spectrum band around 5.9 GHz.

Figure 1:
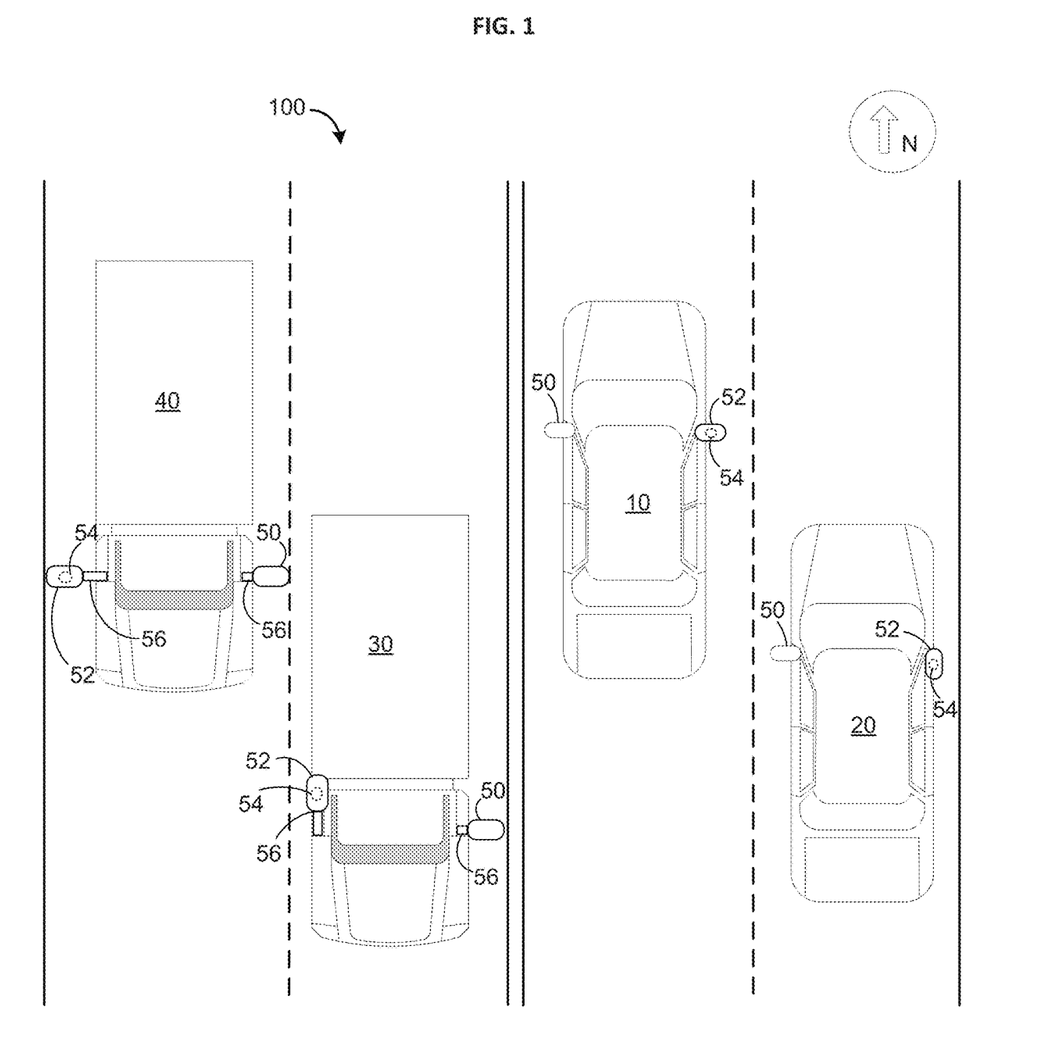
FIG. 1 is an illustration of an example environment for communicating ambient air temperatures (AAT) between vehicles having AAT sensors in side mirrors, in accordance with certain embodiments.

FIG. 1 illustrates an example environment 100 for improving an accuracy of ambient air temperature (AAT) measurements in a vehicle 10 using temperature measurements wirelessly received from one or more nearby vehicles 20, 30, and 40, in accordance with embodiments. In the illustrated embodiment, the nearby vehicles 20, 30, and 40 are in close proximity to each other at least because they are traveling on the same two-way, four lane road as the vehicle 10 and are within a predetermined proximity of the vehicle 10. In other embodiments, the nearby vehicles 20, 30, and 40 may be within a general vicinity of the vehicle 10, but not necessarily on the same road or surface (e.g., one or more of adjoining or intersecting roads, adjoining or adjacent parking lots, driveways, divided highways, etc.).

As shown, each of the vehicles 10, 20, 30, and 40 includes a first side mirror 50 coupled to a driver's side of the vehicle and a second side mirror 52 coupled to a passenger's side of the vehicle. In the illustrated embodiment, an ambient air temperature (AAT) sensor 54 is included in or located on the passenger side mirror 52 for each of the vehicles 10, 20, 30, and 40. In other embodiments, the AAT sensor 54 may be located on the driver side mirror 50 for one or more of the vehicles 10, 20, 30, and 40, or on a different location of the vehicle (e.g., under a hood of the vehicle, in a front bumper or grill of the vehicle, etc.). The AAT sensor 54 may include any type of temperature sensing technology capable of measuring or detecting an outside air temperature, such as, for example, a silicon bandgap temperature sensor or other integrated circuit sensor, a digital thermometer or thermistor, etc.

In the environment 100, the vehicle 10 is capable of communicating with any one of the vehicles 20, 30, and 40 to obtain temperature readings measured by the AAT sensor 54 included in that vehicle. In some cases, the vehicle 10 generally broadcasts a request for AAT measurements, and the request is received by any vehicle within a broadcast range (or predetermined proximity) of the vehicle 10 (e.g., 100 to 1000 meters), such as, e.g., the neighboring vehicles 20, 30, and 40. If more than one vehicle responds to the request, the vehicle 10 may calculate an average of the received temperature measurements, so as to use local crowd data to determine an accuracy of the vehicle's temperature sensor. Alternatively, the vehicle 10 may apply one or more selection rules to determine which AAT reading to use or which nearby vehicle takes precedence over the others (e.g., use the first-received response, give preference to vehicles traveling in an opposite direction so the sensor 54 is on the opposite side of the vehicle, give preference to the nearest vehicle, etc.).

In other cases, the vehicle 10 first pings the vehicles 20, 30, and 40, and any other vehicle within the broadcast range, to determine which nearby vehicles are able and willing to share temperature data. If two or more vehicles return a positive response, the vehicle 10 may apply the one or more selection rules to select a vehicle from the two or more responding vehicles. The vehicle 10 can then use point-to-point communication to transmit the request for temperature data to the selected vehicle. In some cases, the vehicle 10 may rank the nearby vehicles based on the one or more selection rules and send a request for temperature data to each vehicle on the list, one by one, until a positive response (e.g., in the form of at least one AAT measurement) is sent back to the vehicle 10.

In one embodiment, the selection rules include giving first preference to a vehicle traveling in an opposite direction than the requesting vehicle (e.g., the vehicle 10), and then giving preference to whichever vehicle is in closest proximity to the requesting vehicle. As shown in FIG. 1, selecting a vehicle that is traveling opposite the vehicle 10 ensures that the AAT sensor 54 of the selected vehicle is located on an opposite side of the road (e.g., West) than the AAT sensor 54 of the vehicle 10 (e.g., East). Applying these rules to the environment 100, while the vehicle 20 is the closest in proximity to the vehicle 10, it is traveling in the same direction (e.g., North) as the vehicle 10, and therefore, will not be selected, or will be ranked lower than the other neighboring vehicles 30 and 40, which are traveling in the opposite direction (e.g., South) of vehicle 10. Of the two vehicles 30 and 40, the vehicle 30 is nearest to the vehicle 10. Thus, the vehicle 10 may send a request for AAT measurements to the vehicle 30 first. If the vehicle 30 is not able to fulfill the request (e.g., due to a fault AAT sensor), the vehicle 10 may continue down a ranked list of nearby vehicles and then send the request to, for example, the vehicle 40. In some cases, the selection rules may include determining whether the passenger side mirror 52 of the other vehicle is in a folded or unfolded position, preference being given to the vehicle that has an unfolded mirror 52, as this is likely to increase the accuracy of the temperature measurement. It will be appreciated that other techniques may be used by the vehicle 10 to select one of a plurality of neighboring or nearby vehicles for obtaining AAT measurements.

Although the embodiments described herein are explained in the context of the vehicle 10 receiving AAT measurements from one or more surrounding vehicles 20, 30, and 40, it should be appreciated that the same techniques may be applied by any one of the nearby vehicles 20, 30, and 40. For example, in such cases, the original vehicle 10 may provide ambient air temperature measurements to one of the other nearby vehicles 20, 30, and 40. Moreover, while FIG. 1 shows only three nearby vehicles 10, 20, and 30, it will be appreciated that there may be any other number of vehicles in the environment 100, in accordance with the techniques described herein. Further, while FIG. 1 shows only vehicle 20 moving in the same direction at vehicle 10, and the other two vehicles 30 and 40 moving in an opposite direction on the road, it should be appreciated that the vehicles may be moving in any direction or not moving at all. The embodiments described herein are intended to cover these and other variations of the environment 100 shown in FIG. 1, as will be apparent to those skilled in the relevant art.

Figure 2:
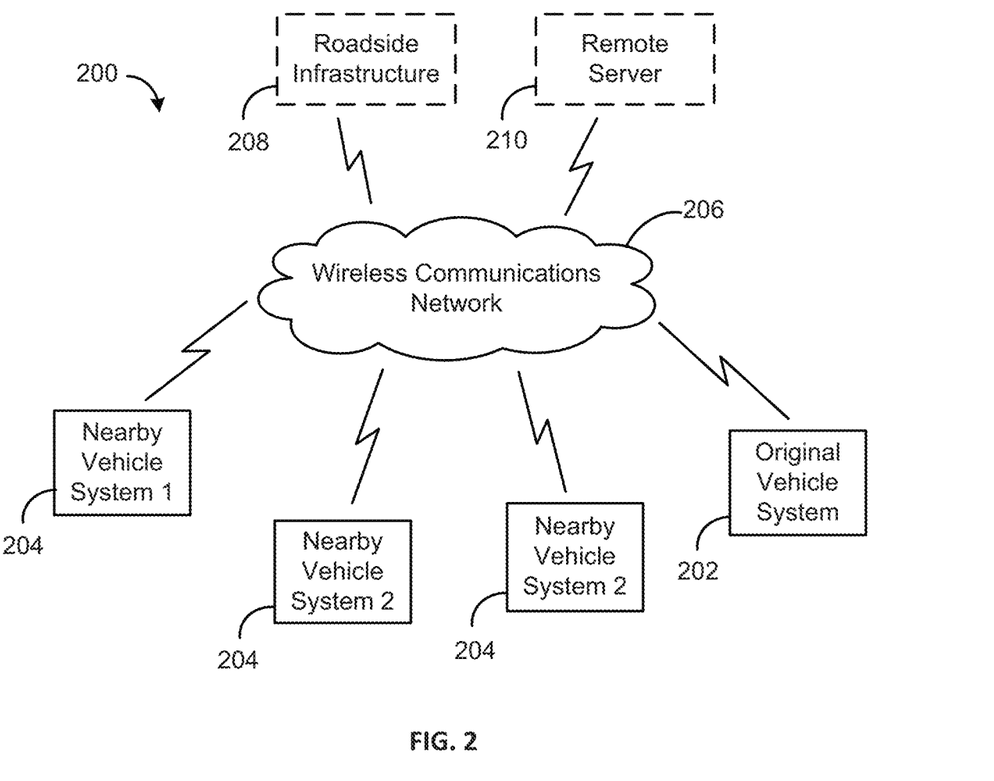
FIG. 2 is an illustration of an exemplary wireless system for communicating air temperature readings between various components over a wireless communication network, in accordance with certain embodiments.

Referring additionally to FIG. 2, shown is an example wireless system 200 for providing ambient air temperature measurements to a vehicle system 202 included in the vehicle 10 (also referred to herein as "original vehicle system"), in accordance with embodiments. The wireless system 200 may correspond to the environment 100 shown in FIG. 1. For example, the wireless system 200 includes a plurality of nearby vehicle systems 204 that may be included in any one of the nearby vehicles 20, 30, and 40. In embodiments, the vehicle system 202 includes vehicle computing system 400 shown in FIG. 4 and described herein, and each of the vehicle systems 204 may be substantially similar to the vehicle system 202.

The vehicle systems 202 and 204 can be configured to be in wireless communication with each other via a wireless communication network 206 (also referred to herein as "wireless network"). For example, the vehicle systems 202 and 204 can communicate with the wireless network 206 using a telematics control unit (TCU) included in each of the systems (e.g., TCU 408 shown in FIG. 4). The vehicle systems 202 and 204 can use any type of wireless communication system to communicate with each other and/or with roadside units or other external entities, including, for example, digital cellular systems, Bluetooth systems, wireless LAN systems, infrared systems, radio frequency identification (RFID), near field communication (NFC), etc. In a preferred embodiment, each of the vehicle system 202 and 204 is configured to wirelessly communicate with each other using dedicated short range communication (DSRC) technology, or any other wireless technology that can provide very high data transmission, low latency, and reliable performance in high vehicle speeds and extreme weather conditions. In such embodiments, the wireless network 206 is a DSRC network, and the TCU of each vehicle system 202, 204 includes a DSRC transceiver for facilitating wireless communication via the DSRC network 206.

In some embodiments, the wireless system 200 further includes roadside infrastructure 208 for facilitating communication between the vehicle systems 202 and 204, and/or for communicatively connecting one or more of the vehicle systems 202 and 204 to a remote server 210. The roadside infrastructure 208 may include one or more roadside units (not shown), such as, for example, a node, computing device, or communication tower, located at various points along the road.

In some cases, the vehicle systems 202 and 204 can communicate with each other directly through the wireless network 206, for example, using dedicated short-range communications (DSRC) technology. In other cases, the vehicle systems 202 and 204 can communicate with each other through the remote server 210 included in the wireless system 200. For example, each of the vehicle systems 202 and 204 may be configured to send wireless transmissions to the remote server 210, using the TCU included therein, and the remote server 210 may be configured to forward the wireless transmission to the appropriate vehicle system 202, 204.

In some embodiments, the remote server 210 is a weather cloud station or is communicatively coupled to a weather cloud station. In either case, the weather cloud station may be configured to collect local temperature data, either using temperature sensor(s) included on the station itself or by polling vehicles in the local area, such as, e.g., the vehicles 10, 20, 30, and 40. In such cases, the vehicle system 202 may receive local temperature readings (e.g., an average of the temperature readings from surrounding vehicles and/or the weather cloud station) directly from the remote server 210.

Figure 3:
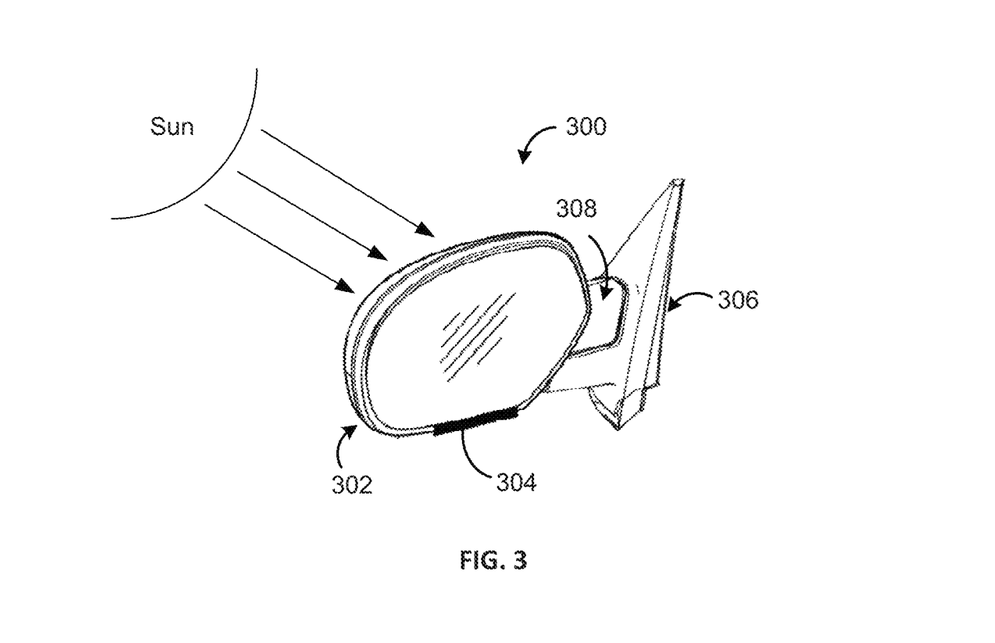
FIG. 3 is an illustration of an exemplary power mirror assembly, in accordance with certain embodiments.

Referring additionally to FIG. 3, shown is an exemplary side mirror assembly 300, in accordance with embodiments. As shown, the side mirror assembly 300 includes a mirror portion 302, or a housing for the mirror, and an ambient air temperature (AAT) sensor 304 under, or on a bottom side of, the mirror portion 302. The side mirror assembly 300 also includes an attachment surface 306 for attaching the mirror assembly 300 to a side of the vehicle body. The side mirror assembly 300 further includes a moveable portion 308 for moving the mirror portion 302 between an unfolded position, where the mirror portion 302 extends out and away from the side of the vehicle body (e.g., as shown in FIG. 3) and a folded position, where the mirror portion 302 is disposed adjacent to and extends along the side of the vehicle body. As will be appreciated, the unfolded mirror position may enable a vehicle driver, if any, to utilize the rear-view mirror portion 302, while the folded mirror position may render the rear-view mirror portion 302 unusable for rear viewing.

In some embodiments, the side mirror assembly 300 further includes an extendable portion (e.g., extendable portion 56 shown in FIG. 1) for moving the mirror portion 302 between a neutral or home position (e.g., as shown in FIG. 3) to an extended position that extends or increases an overall length of the mirror assembly 300 by pushing the mirror portion 302 further away from the attachment surface 306 (e.g., substantially perpendicular to the attachment surface 306). In some cases, the extendable portion uses a telescoping mechanism to lengthen the mirror assembly 300, as will be appreciated.

In a preferred embodiment, the mirror assembly 300 is electronically powered and includes one or more control modules (not shown) for providing automated movement of the mirror assembly 300 (also referred to herein as "power mirror assembly"). For example, the power mirror assembly 300 may include a power folding mechanism (e.g., power folding mechanism 426 shown in FIG. 4) and/or a power extending mechanism (e.g., power extending mechanism 428 shown in FIG. 4) that are operatively coupled to a processor (e.g., data processor 402 shown in FIG. 4) for carrying out automated movement commands, as will be described in more detail below.

Due to the placement of the AAT sensor 304 on the exterior of the mirror assembly 300, the AAT sensor 304 may be able to more accurately measure the outside air temperature than, for example, temperature sensors placed under the hood of the vehicle. However, the external placement also makes the AAT sensor 304 more susceptible to sun loading. Placement in the unfolded position may allow more air flow over the mirror assembly 300, which can help decrease the effects of sun loading on the AAT sensor 304. By contrast, when the mirror assembly 300 is in the folded position, a smaller surface area is subject to air flow and so, the effect of sun loading may be greater. At the same time, an unfolded side mirror position may not be a preferred position in certain scenarios, such as, for example, for an autonomous vehicle, especially when driving in city traffic, or for vehicles driving on a highway due to increased wind resistance or aerodynamic drag. The techniques disclosed herein balance these competing factors by unfolding and/or extending the mirror assembly 300 only as needed to remove a sun loading effect and re-folding and/or retracting the mirror assembly 300 when the temperature reading has been corrected or the need for corrective action is otherwise resolved. As a result, the accuracy of measurements made by the AAT sensor 304 can be improved.

Referring back to FIG. 1, in embodiments, each of the side mirrors 50 and 52 may be individually controlled by the respective vehicle system. For example, in FIG. 1, each of the vehicles 10, 20, 30, and 40 are shown with the passenger side mirrors 52 in different positions, while the driver side mirrors 50 are in an unfolded position. In particular, the passenger side mirror 52 of vehicle 10 is shown in the unfolded position, while the passenger side mirror 52 of the vehicle 20 is shown in the folded position. As will be appreciated, telescoping or extending side mirrors are usually found on trucks or larger vehicles that need the wider field of view. Thus, in FIG. 1, vehicles 30 and 40 are shown as trucks having extendable side mirrors for both the driver side mirror 50 and the passenger side mirror 52. For example, each of the mirrors 50 and 52 includes an extendable portion 56 comprising a power extending mechanism for automatically controlling the extending feature of the mirror. In the illustrated example, the driver side mirrors 50 on both of the vehicles 30 and 40 are in the neutral position (e.g., unextended), in addition to being in the unfolded position, the passenger side mirror 52 of the vehicle 30 is shown in an extended and folded position, and the passenger side mirror 52 of the vehicle 40 is shown in an extended and unfolded position.

Figure 4:
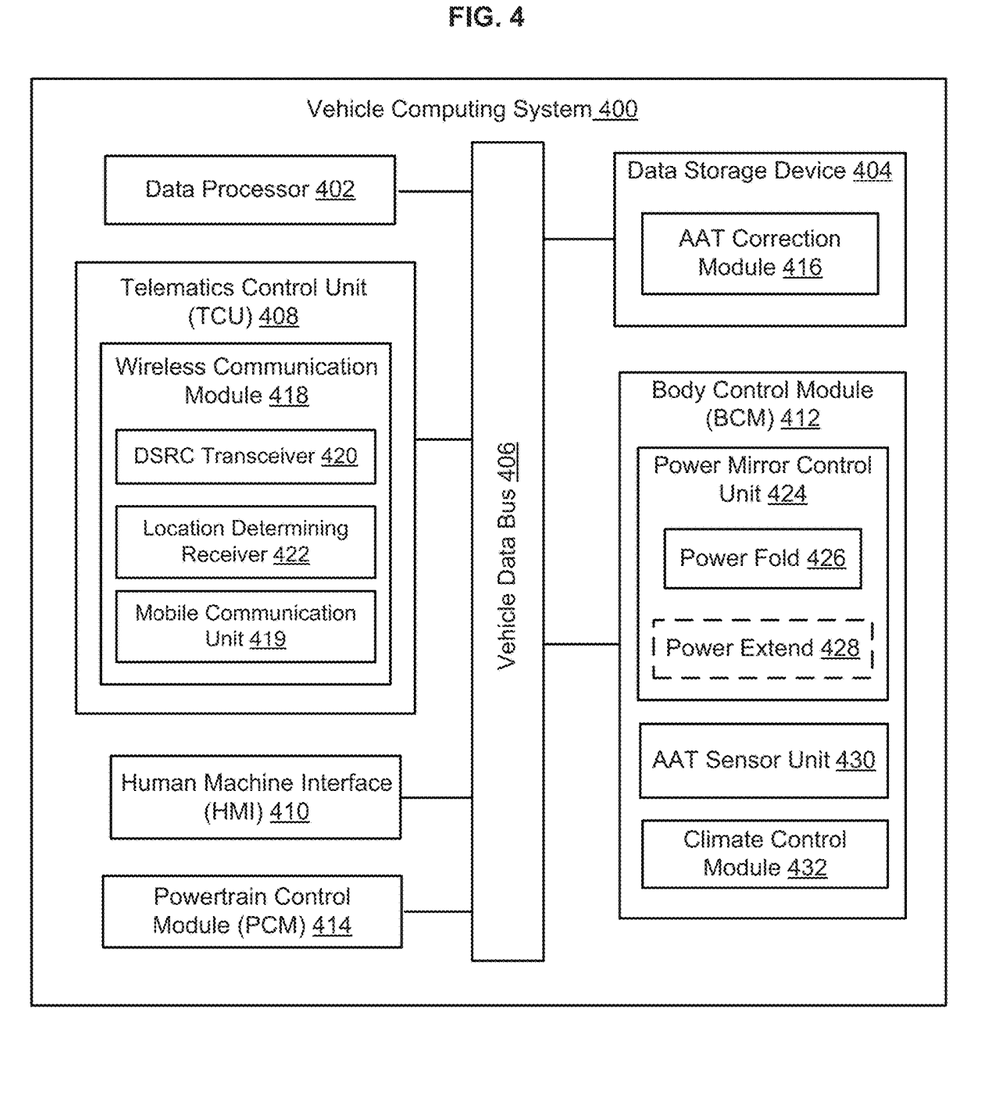
FIG. 4 is a block diagram of an example vehicle computing system, in accordance with certain embodiments.

Referring now to FIG. 4, shown is an example vehicle computing system (VCS) 400 that may be included in a vehicle, for example, as part of a vehicle electronics system or an infotainment system of the vehicle. The VCS 400 may be an infotainment system such as the SYNC® system manufactured by FORD MOTOR COMPANY®. Other embodiments of the VCS 400 can include different, fewer, or additional components than those described below and shown in FIG. 4. The VCS 400 may be included in any size, class, or type of vehicle, including, for example, autonomous vehicles, hybrid vehicles, electric vehicles, trucks, sedans, minivans, sports utility vehicles, etc.

As illustrated, the VCS 400 comprises a data processor 402 (e.g., an electronic data processor), a data storage device 404 (e.g., an electronic memory), and a vehicle data bus 406. The VCS 400 can further include various electronic control units (ECUs) responsible for monitoring and controlling the electrical systems or subsystems of the vehicle. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 400 include a telematics control unit 408, a human machine interface (HMI) or user interface 410, a body control module (BCM) 412, and a powertrain control module (PCM) 414. Though not shown, the VCS 400 may include other ECUs.

The ECUs of the VCS 400 are interconnected by the vehicle data bus 106 (such as, e.g., a controller area network (CAN) bus or an automotive Ethernet bus), which passes data to and from the various ECUs, as well as other vehicle and/or auxiliary components in communication with the VCS 400. Further, the data processor 402 can communicate with any one of the ECUs and the data storage device 404 via the data bus 406 in order to carry out one or more functions, including the functions associated with an ambient air temperature ("AAT") correction module 416.

The data processor 402 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 400 can comprise a general purpose computer that is programmed with various programming instructions or modules stored in the data storage device 404 (such as, e.g., the AAT correction module 416) or elsewhere.

The telematics control unit (TCU) 408 can be an ECU for enabling the VCS 400 to connect to one or more wireless networks, such as, for example, WiFi, cellular, Bluetooth, NFC, RFID, satellite, DSRC, and infrared. In embodiments, the TCU 408 includes a wireless communication module 418 comprising one or more antennas, radios, modems, receivers, and/or transmitters (not shown) for connecting to, or interfacing with, the various wireless networks. As shown, the wireless communication module 418 includes a mobile communication unit 419 for wirelessly communicating over a cellular network (e.g., GSM, GPRS, LTE, 3G, 4G, CDMA, etc.), an 802.11 network (e.g., WiFi), a WiMax network, and/or a satellite network. In some embodiments, the TCU 408 communicates with the remote server 210 shown in FIG. 2 via the mobile communications unit 419 to obtain local temperature readings.

In a preferred embodiment, the wireless communication module 418 includes a DSRC transceiver 420 for receiving data from, transmitting data to, or otherwise communicating with one or more vehicle systems and/or roadside infrastructure over a DSRC network. For example, the VCS 400 may be included in the vehicle system 202 of the wireless system 200 shown in FIG. 2 and may use the DSRC transceiver 420 to communicate with one or more of the nearby vehicle systems 204 and/or the roadside infrastructure 208 included in the wireless system 200 via the wireless communication network 206, which includes at least the DSRC network. In other embodiments, the wireless communication module 418 may include another type of short-range wireless transceiver for communicating with nearby vehicle systems 204 and/or infrastructure 208 and the wireless communication network 206 may include one or more other wireless networks, such as, for example, RFID, NFC, or Bluetooth networks.

As shown in FIG. 1, the wireless communication module 418 also includes a location-determining receiver 422 that uses satellite signals, terrestrial signals, or both to determine a current, or present, location or position of the vehicle. The location-determining receiver 422 can provide location data (e.g., longitudinal coordinates, latitudinal coordinates, altitude/elevation measurements, etc.) to the data processor 402 and/or the AAT correction module 416 via the wireless communication module 418 and the data bus 406. In embodiments, the location data received via the location-determining receiver 422 can be used to identify a direction of travel of the vehicle, which may be used by the data processor 402 to select between a plurality of temperature measurements received via the DSRC transceiver 420, e.g., in accordance with the selection rules.

In one embodiment, the location-determining receiver 422 is a Global Positioning System (GPS) receiver with a differential correction receiver for providing precise measurements of the geographic coordinates or position of the vehicle. In another embodiment, the location-determining receiver 422 is a Global Navigation Satellite System (GNSS) receiver that uses the GPS, Galileo, BeiDou, GLONASS, or other satellite systems to precisely pinpoint a current geographic location of the vehicle, for example, by using various satellite signals to triangulate the position of the vehicle.

In embodiments, the TCU 408 receives external data, including ambient air temperature measurements, from one or more nearby vehicle systems 204, the roadside infrastructure 208, and/or the remote server 210 via the wireless communication module 418 and/or the DSRC transceiver 420, and provides the external data to the data processor 402, the data storage device 404, the user interface 410, and/or any other appropriate component of the VCS 400. In one embodiment, when the TCU 408 receives AAT measurements from the wireless network 206, the TCU 408 sends the measurements to the data processor 402, via the vehicle data bus 406, for processing in accordance with the AAT correction module 416. In addition, the TCU 408 transmits internal data, including a request for AAT measurements, to the other components of the wireless system 200 via the wireless communication module 418 and/or the DSRC transceiver 420. The TCU 408 may receive the internal data from the data processor 402, the data storage device 404, the user interface 410, or other component of the VCS 400.

According to embodiments, the user interface 410 (also known as a human-machine interface (HMI)) can be an ECU for enabling user interaction with the vehicle system 400 and for presenting vehicle information to the vehicle operator or driver. The user interface 410 can be configured to interact with other ECUs of the vehicle system 400, including the TCU 408, the data storage device 404, and/or the data processor 402, via the data bus 406, in order to provide information or inputs received via the user interface 410 to an appropriate component of the VCS 400 and to present, to the vehicle operator, information or outputs received from the various components of the VCS 400. As an example, the user interface 410 can comprise one or more displays or display screens, one or more audio speakers, and a plurality of input devices, as well as various other devices for inputting, entering, receiving, capturing, displaying, or outputting data associated with the vehicle computing system 400, the AAT correction module 416, and/or the techniques disclosed herein. In some embodiments, the user interface 410 includes an instrument panel (IP) (not shown) positioned in a dashboard of the vehicle for housing instrumentation and controls for operation of the vehicle, such as, e.g., a steering wheel and various gauges (e.g., speedometer, odometer, fuel gauge, etc.), as well as vehicle indicators, such as, e.g., outside temperature readings, gear selector position, seat belt warnings, etc.

The body control module (BCM) 412 is an ECU for controlling and monitoring various electronic accessories in a body of the vehicle, including components within the vehicle cabin. For example, the BCM 412 may include a power doors control unit (not shown) for controlling the vehicle doors, including locking, unlocking, opening, and/or closing the doors and a power windows control unit (not shown) for controlling the vehicle windows and/or a power roof unit (e.g., moonroof, sunroof, convertible top, etc.), including opening and closing the windows or the roof unit. In some embodiments, the BCM 120 also controls the headlights, tail lights, turn signals, and any other exterior lights of the vehicle, and interior lighting of the vehicle. As shown in FIG. 4, the BCM 412 includes a power mirror control unit 424 for controlling each side rear view mirror of the vehicle (e.g., power mirror assembly 300 shown in FIG. 3). The power mirror control unit 424 includes a power fold mechanism 426 for controlling or moving the mirrors between the folded position and the unfolded position. In some embodiments, the power mirror control unit 424 further includes a power extend mechanism 428 for controlling or moving the mirrors between the neutral position and the extended position.

As also shown in FIG. 4, the BCM 412 may also include an ambient air temperature (AAT) sensor unit 430 for controlling and monitoring each outside air temperature sensor in the vehicle (e.g., AAT sensor 304 shown in FIG. 3), including taking temperature measurements in response to a request from the data processor 402, in response to a request for on-board diagnostics (OBD), and/or at a predetermined or pre-scheduled time. In some embodiments, the AAT sensor unit 430 may be included in the power mirror control unit 424. As illustrated, the BCM 412 further includes a climate control module 432 for controlling and monitoring an air conditioning and/or heating system (not shown) of the vehicle. In some embodiments, the climate control module 432 receives AAT measurements from the AAT sensor unit 430 and uses the measurements to set various climate control settings. For example, the climate control module 432 may automatically adjust an interior cabin temperature based on the outside temperature measurement received from the AAT sensor unit 430.

The powertrain control module (PCM) 414 is an ECU for controlling and monitoring the engine and transmission of the vehicle. In some embodiments, the PCM 414 can be separated into two separate ECUs, specifically an engine control unit and a transmission control unit. In either case, the PCM 414 can be configured to control starting and stopping of the engine of the vehicle, as well as control acceleration and/or deceleration of the vehicle. In embodiments, the PCM 414 may request AAT measurements from the AAT sensor unit 430 of the BCM 412, via the vehicle data bus 406, may monitor changes in the AAT measurements, and may use the temperature measurements, or changes thereto, for carrying out certain engine controls and/or on-board diagnostics.

The data storage device 404 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 404 stores one or more software program modules or software instructions, including the ACC correction module 416, for execution by the data processor 402. According to embodiments, the ACC correction module 416 is configured or adapted to obtain a first temperature measurement from an ambient air temperature (AAT) sensor (e.g., sensor 304 shown in FIG. 3) located in a power mirror assembly (e.g., power mirror assembly 300 shown in FIG. 3) attached to a side of the vehicle; obtain a second temperature measurement from a wireless network (e.g., wireless communication network 206 shown in FIG. 2); and upon determining that the first temperature measurement is greater than the second temperature measurement, cause the power mirror assembly to move to a first position (e.g., an unfolded position) relative to the vehicle side.

The ACC correction module 416 may also be configured to cause the mirror assembly to move from the unfolded position to the folded position upon determining that measurements made by the air temperature sensor are increasing at a faster rate than a plurality of measurements received via the wireless transceiver. The ACC correction module 416 may also be configured to, after moving the mirror assembly to the first position, obtain a third temperature measurement from the air temperature sensor; obtain a fourth temperature measurement from the wireless network; and cause the mirror assembly to move to a second position (e.g., an extended position or a folded and extended position) upon determining that the third temperature measurement is greater than the fourth temperature measurement by at least a predetermined amount. Other functions or features of the ACC correction module 416 may include the steps of method 500 shown in FIG. 5 and/or other techniques described herein for improving the accuracy of AAT readings in the vehicle.

Figure 5:
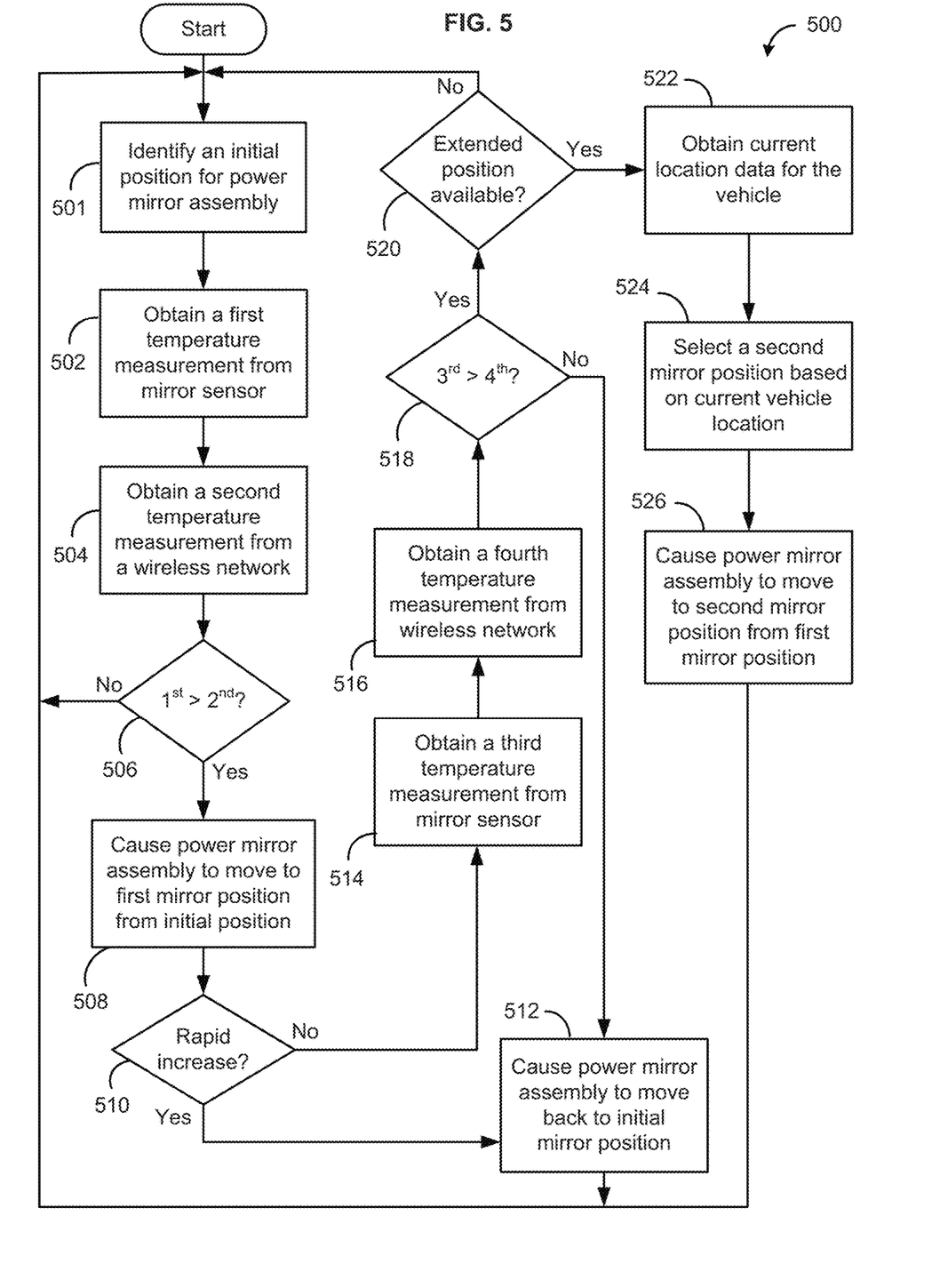
FIG. 5 is a flow diagram of an example method for correcting air temperature reading in a vehicle, in accordance with certain embodiments.

FIG. 5 illustrates an example method 500 for correcting an air temperature reading in a vehicle using temperature measurements received from a wireless network, in accordance with embodiments. The method 500 can be carried out by a vehicle capable of communicating with the wireless network, such as, e.g., the vehicle 10 shown in FIG. 1, or more specifically, a vehicle computing system therein, such as, e.g., the VCS 400 shown in FIG. 4. Further, the vehicle system may interact with one or more components of a wireless system, such as, e.g., the nearby vehicle systems 202, roadside infrastructure 208, and/or remote server 210 of the wireless system 200 shown in FIG. 2, to carry out one or more operations of the method 500. In one embodiment, the method 500 is implemented, at least in part, by the data processor 402 executing software stored in the data storage device 404, such as the ACC correction module 416 shown in FIG. 4.

The method 500 can begin at step 501, where the processor identifies an initial position of a power mirror assembly (such as, e.g., side mirror assembly 300 shown in FIG. 3) comprising an ambient air temperature (AAT) sensor (such as, e.g., AAT sensor 304 shown in FIG. 3). As shown in FIG. 1, the power mirror assembly is attached to a side of the vehicle (also referred to herein as the "original vehicle") and may be disposed in one of a plurality of positions relative to the vehicle side. For example, the power mirror assembly may be placed in a folded position extending along or flush with the side of the vehicle (e.g., mirror 54 of vehicle 20 in FIG. 1). As another example, the power mirror assembly may be placed in an unfolded position (e.g., mirror 54 of vehicle 10 in FIG. 1), which extends the power mirror assembly away from the side or body of the vehicle. If the power mirror assembly includes an extendable portion, the power mirror assembly may be placed in an unfolded and extended position (e.g., mirror 54 of vehicle 40 in FIG. 1), so as to increase a length of the mirror assembly and further extend the mirror assembly away from the vehicle side. Or the power mirror assembly may be placed in a folded and extended position (e.g., mirror 54 of vehicle 30), so that the mirror assembly extends further along the vehicle side.

At step 501, the processor may request the initial mirror position from the power mirror assembly, itself, or from a control module coupled thereto, such as, e.g., power mirror control unit 424 or body control module 412 shown in FIG. 4. In some cases, the initial position of the power mirror assembly may depend on the current location of the vehicle and/or the type of vehicle. For example, an autonomous vehicle may place the side mirrors in the folded position by default, especially when traveling on a highway due to the improved aerodynamics. As another example, by default, some vehicles may automatically deploy or unfold the side mirrors when entering city limits to prepare for city driving. In other cases, the initial position of the power mirror assembly may depend on whether the vehicle has already gone through at least part of the method 500 and changed its mirror position in response to one of the steps, as will be described below.

At step 502, the processor obtains a first temperature measurement from the AAT sensor included in the power mirror assembly. The AAT sensor may be configured to automatically measure the ambient air temperature at predetermined time intervals and provide the latest measurement to the processor for analysis according to the techniques described herein.

At step 504, the processor receives a second temperature measurement from a wireless network (such as, e.g., wireless communication network 306 shown in FIG. 3), or more specifically, from a nearby vehicle (also referred to herein as a "second vehicle"), roadside infrastructure, or remote server (e.g., weather station) communicatively coupled to the wireless network (collectively referred to herein as "network components"). The network components may have measured the ambient air temperature using an AAT sensor or other temperature measurement tool included thereon. The vehicle and/or processor may be communicatively coupled to the wireless network via a wireless transceiver (e.g., DSRC transceiver 420 shown in FIG. 4) included in a telematics control unit (e.g., TCU 408 shown in FIG. 4) of the vehicle. In embodiments, the wireless network is a dedicated short range communication ("DSRC") network, the wireless transceiver is a DSRC transceiver, and each of the network components are also equipped with DSRC transceivers for communicating with the wireless/DSRC network.

In some embodiments, the processor generates a request for AAT readings and provides the request to the wireless transceiver for broadcasting to the wireless network. In response to the broadcast, the processor may receive a plurality of temperature measurements from one or more network components via the wireless network. In some such cases, obtaining the second temperature measurement at step 504 includes calculating an average of all received measurements and using the average value as the second temperature measurement. In other cases, obtaining the second temperature measurement at step 504 includes selecting the second temperature measurement from the plurality of received measurements using one or more selection criteria. If temperature readings are received from multiple nearby vehicles that satisfy the criteria, the processor may calculate an average of all such temperature readings and use the average value as the second temperature measurement.

In embodiments, the selection criteria may include selecting the temperature measurement based on a direction of travel of the nearby vehicles, as compared to that of the original vehicle (also referred to herein as the "requesting vehicle"). For example, the selection criteria may dictate that the processor should select the temperature measurement that was received from a nearby vehicle traveling in a direction (e.g., South) that is opposite that of the original vehicle (e.g., North), to ensure that the AAT sensors for the two vehicles are on opposite sides of the road (e.g., West and East). This selection criterion may be premised on the assumption that AAT sensors located on opposite sides will not be subject to the same sun loading effect and therefore, if the requesting vehicle's AAT reading is overinflated, the nearby vehicle's temperature reading is not likely to be overinflated as well.

At step 506, the processor compares the first temperature measurement of the vehicle to the second temperature measurement to determine which of the two has a greater value. If the second temperature measurement is higher (e.g., a negative determination at step 506), corrective action may not be required for the AAT sensor. In other words, sun loading may not be overinflating or otherwise affecting the temperature readings measured by the AAT sensor. In such cases, the method 500 may end return to step 502 to repeat the temperature monitoring process. If the first temperature measurement is greater the second measurement (e.g., a positive determination at step 506), the method 500 continues to step 508. In some embodiments, the determination at step 506 further includes determining that the first measurement is greater than the second measurement by at least a predetermined amount (e.g., ten degrees), wherein the predetermined amount is selected to ensure that there is a sufficiently significant difference between the two measurements (e.g., significant enough to suspect a sun loading problem).

At step 508, the processor causes the power mirror assembly to move from the initial position to a first mirror position in an effort to alleviate or remove any sun loading effect on the vehicle's AAT sensor. In embodiments, the first mirror position may be selected based on the initial mirror position. For example, if the mirror assembly's initial position is the folded position (e.g., due to highway driving), the mirror may be moved to the unfolded position, so as to increase an air flow across the power mirror assembly and/or the AAT sensor included thereon. If, on the other hand, the mirror's initial position is the unfolded position (e.g., due to city driving), the mirror assembly may be moved to the folded position. The processor can be operatively coupled to the power mirror assembly, or more specifically, to a power fold mechanism (e.g., power fold mechanism 426 shown in FIG. 4) of the mirror, in order to cause such automatic movement between the folded and unfolded positions.

At step 510, once the mirror assembly has been placed in the first position, the processor determines whether the ambient air temperature sensed by the vehicle's AAT sensor is increasing too quickly or too rapidly. If the temperature readings are increasing too rapidly, this may be an indication that the sun loading effect has increased (e.g., due to the angle of the sun) after moving the power mirror assembly to the unfolded position in step 508. In embodiments, step 510 includes calculating a first rate of change for AAT measurements obtained by the vehicle (e.g., the requesting vehicle), calculating a second rate of change for temperature measurements received from other vehicles and/or the wireless network, and determining whether the first rate exceeds the second rate.

If the first rate is higher, the processor may determine that "yes," the temperature measurements by the vehicle's AAT sensor are increasing too rapidly. Accordingly, the method 500 may continue to step 512, where the processor causes the power mirror assembly to move back to the original or initial mirror position. For example, if the mirror assembly is moved to the unfolded position at step 508, the mirror will be moved back to its initial folded position at step 512. If, on the other hand, the mirror assembly is moved to the folded position at step 508, the mirror will be moved back to its initial unfolded position at step 512. In either case, changing the position of the mirror assembly may help decrease the sun loading angle, which may help slow down the rapid increase in temperature readings.

From step 512, the method 500 may return or loop back to step 501 to repeat monitoring of the temperature measurements made by the vehicle's AAT sensor. In some cases, the processor may insert a cooling cycle (not shown) before repeating step 501 to give the AAT sensor and/or the mirror assembly time to cool down before re-initiating the method 500.

If the determination at step 510 is negative (i.e. the vehicle's AAT measurements are not rapidly increasing), the method 500 may proceed with determining whether the change in mirror position at step 508 has rectified the sun loading effect. In particular, at step 514, the processor obtains another or third temperature measurement from the vehicle's AAT sensor. At step 516, the processor obtains another or fourth temperature measurement from the wireless network, or one of the nearby vehicles included therein. If available, the processor may obtain the fourth temperature measurement from the same nearby vehicle that provided the measurement at step 504.

At step 518, the processor compares the third measurement to the fourth measurement to determine which reading is higher. In some cases, the processor also determines if the third measurement exceeds the fourth measurement by the predetermined amount (e.g., ten degrees) used at step 506, to ensure that the two values are significantly different. If the temperature measured by the vehicle's AAT sensor does not exceed the temperature measurement(s) received from nearby vehicles, it can be assumed that the sun loading effect has been effectively removed by the change in mirror position. In such cases, the mirror assembly may be moved back to its initial position. For example, if the determination at step 518 is negative, the method 500 may continue back to step 512, where the processor causes the power mirror assembly to return to the initial position.

If the third measurement exceeds the fourth measurement at step 518, this may indicate that the vehicle's AAT sensor was not sufficiently corrected by the first change in mirror position and/or additional corrective action is required to lower the temperature readings to that of nearby vehicles or other local temperature readings. In such cases, the method 500 may proceed with applying a second change in position to the power mirror assembly, if possible. In particular, at step 520, the processor determines whether the power mirror assembly has a power extend or telescope feature. If the mirror assembly is not extendable in this manner, the method 500 may loop back to step 501 to repeat the temperature monitoring and correcting process described above.

If, on the other hand, the mirror assembly includes a power extend mechanism (such as, e.g., power extend mechanism 428 shown in FIG. 4), the method 500 continues to step 522, where the processor obtains current location data for the vehicle. The processor may obtain current vehicle location data from a location-determining receiver (e.g., location-determining receiver 422 shown in FIG. 4). In embodiments, the data may include information that defines certain characteristics about the vehicle's current location, such as, for example, whether the vehicle is driving in a rural area or in an urban environment, or whether the vehicle is driving on city streets or on a highway.

At step 524, the processor selects a second position for the power mirror assembly from two or more different positions based on the location data obtained at step 522. In embodiments, certain locations, or location categories, may be associated with one or more mirror positions, or a specified sequence of positions. For example, when the vehicle is driving in the city, the second mirror position may include folding the mirror (if the mirror is unfolded) and then extending the side mirror, so that the mirror assembly extends along the vehicle side (e.g., as shown by the side mirror 52 on the vehicle 30 in FIG. 1). The folded and extended position may be preferred for city driving, for example, to avoid objects moving close to the vehicle or to stay clear of objects in narrow streets.

As another example, when the vehicle is driving on the highway, the second mirror position may including unfolding the mirror (if the mirror is folded) and then extending the side mirror, so that the mirror assembly fully extends out from the vehicle side (e.g., as shown by the side mirror 52 on the vehicle 40 in FIG. 1). This mirror position allows more air flow across the sensor and/or mirror assembly, thus providing faster and more effective cooling. The unfolded and extended position may be acceptable only during highway driving, as opposed to city driving, at least because highway lanes are typically large enough to accommodate the fully extended side mirror position. However, the unfolded and extended position may be less desirable due to the increased resistance created by this position, thus leading to poor fuel economy. Accordingly, the unfolded and extended position may be used only temporarily or for a short time period, such as, e.g., until the vehicle sensor's temperature readings are no longer overinflated or a fault condition is determined.

At step 526, the processor causes the power mirror assembly to move to the second mirror position selected at step 524, for example, by providing instructions to the power fold mechanism and/or the power extend mechanism of the power mirror assembly. After completion of step 526, the method 500 may loop back to step 501 and repeat the temperature monitoring and correcting process described above.

In general, once the side mirror is extended out from the vehicle side, in the unfolded position and/or in the extended position, the AAT sensor should experience more air flow, especially when the vehicle is traveling at higher speeds, and in response to the increased air flow, the sensor's AAT readings should drop below at least the first temperature reading obtained at step 502. In some embodiments, the processor may determine a fault condition if adjusting or changing the position of the power mirror assembly has little or no effect on the temperature measurements obtained by the vehicle's AAT sensor.

In some embodiments, the processor may look at other factors in order to determine whether the AAT sensor is failing. For example, the processor may consider the time of day (e.g., AM or PM, day or night, etc.) and/or the current weather when determining whether an AAT reading is overinflated. In some cases, the processor may obtain information related to sun activity from one or more solar cells included on the vehicle (e.g., behind the rear view mirror, on a roof of the vehicle, etc.). The sun activity information may indicate whether the skies are clear (i.e. the sun is shining on the vehicle) or cloudy (i.e. the sun is not shining on the vehicle). The sun activity information may also indicate an angle at which the sun is shining onto the vehicle. If the sun activity information contradicts or clashes with a high AAT reading, the processor may determine a fault condition for the sensor. For example, a fault condition may be present if the AAT reading is high despite it being a cloud day or despite the sun is shining on an opposite side of the car (i.e. not on the AAT sensor). Once a fault condition is determined, the processor may notify the powertrain control module 414, the body control module 412, or other component of the vehicle computing system 400 that relies on AAT measurements from the AAT sensors in the power mirror assembly for certain operations and/or diagnostics. In response, the components of the VCS 400 may begin using the temperature measurements received from the wireless network instead of the AAT sensor's readings, at least until the AAT sensor can be repaired or replaced.

In certain embodiments, the process descriptions or blocks in the figures, such as FIG. 5, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle, comprising:
    a mirror assembly attached to a vehicle side and including an air temperature sensor for measuring a first temperature value;
    a wireless transceiver for receiving a second temperature value from a wireless network; and
    a processor configured to, upon determining that the first temperature value is greater than the second temperature value, cause the mirror assembly to move to a first position relative to the vehicle side,
    wherein the mirror assembly further includes a power folding mechanism operatively coupled to the processor, and the movement to the first position includes moving the mirror assembly from a folded position extending along the vehicle side to an unfolded position extending away from the vehicle side.

2. The vehicle of claim 1, wherein the processor causes the movement of the mirror assembly to the first position upon further determining that the first temperature value is greater than the second temperature value by at least a predetermined amount.

3. The vehicle of claim 2, wherein the processor is further configured to:
    after moving the mirror assembly to the first position, obtain a third temperature value from the air temperature sensor;
    receive a fourth temperature value via the wireless transceiver; and
    cause the mirror assembly to move to a second position upon determining that the third temperature value is greater than the fourth temperature value by at least the predetermined amount.

4. The vehicle of claim 3, wherein the processor is further configured to select the second position for the mirror assembly from a plurality of positions based on a current location of the vehicle.

5. The vehicle of claim 1, wherein the second temperature value is received from a second vehicle communicatively coupled to the wireless network.

6. The vehicle of claim 5, wherein the processor obtains the second temperature value by selecting the second temperature value from a plurality of values received from the wireless network, based on a direction of travel of the second vehicle.

7. The vehicle of claim 1, wherein the processor is further configured to cause the mirror assembly to move from the unfolded position to the folded position upon determining that values measured by the air temperature sensor are increasing at a faster rate than a plurality of values received via the wireless transceiver.

8. The vehicle of claim 1, wherein the mirror assembly further includes a power extending mechanism operatively coupled to the processor, and the movement to the first position includes moving the mirror assembly from a neutral position to an extended position for increasing a length of the mirror assembly.

9. The vehicle of claim 1, wherein the wireless network is a dedicated short range communication (DSRC) network.

10. A vehicle, comprising:
a mirror assembly attached to a vehicle side and including an air temperature sensor for measuring a first temperature value;
a wireless transceiver for receiving a second temperature value from a wireless network; and
a processor configured to, upon determining that the first temperature value is greater than the second temperature value, cause the mirror assembly to move to a first position relative to the vehicle side,
wherein the mirror assembly further includes a power extending mechanism operatively coupled to the processor, and the movement to the first position includes moving the mirror assembly from a neutral position to an extended position for increasing a length of the mirror assembly.

11. A vehicle, comprising:
a mirror assembly attached to a vehicle side and including an air temperature sensor for measuring a first temperature value;
a wireless transceiver for receiving a second temperature value from a wireless network; and
a processor configured to, upon determining that the first temperature value is greater than the second temperature value, cause the mirror assembly to move to a first position relative to the vehicle side,
wherein the processor causes the movement of the mirror assembly to the first position upon further determining that the first temperature value is greater than the second temperature value by at least a predetermined amount.

12. A vehicle, comprising:
a mirror assembly attached to a vehicle side and including an air temperature sensor for measuring a first temperature value;
a wireless transceiver for receiving a second temperature value from a wireless network; and
a processor configured to, upon determining that the first temperature value is greater than the second temperature value, cause the mirror assembly to move to a first position relative to the vehicle side,
wherein the second temperature value is received from a second vehicle communicatively coupled to the wireless network.

13. A vehicle, comprising:
a mirror assembly attached to a vehicle side and including an air temperature sensor for measuring a first temperature value;
a wireless transceiver for receiving a second temperature value from a wireless network; and
a processor configured to, upon determining that the first temperature value is greater than the second temperature value, cause the mirror assembly to move to a first position relative to the vehicle side,
wherein the wireless network is a dedicated short range communication (DSRC) network.

* * * * *